United States Patent [19]
Peterson

[11] Patent Number: 5,101,920
[45] Date of Patent: Apr. 7, 1992

[54] PERSONAL MOBILITY VEHICLE

[75] Inventor: Gordon L. Peterson, Holmes Beach, Fla.

[73] Assignee: Alpha Mobility, Inc., Sarasota, Fla.

[21] Appl. No.: 602,211

[22] Filed: Oct. 22, 1990

[51] Int. Cl.$^5$ .............................................. B62D 27/06
[52] U.S. Cl. ..................................... 180/11; 180/208;
180/907; 280/278; 280/287; 280/62; 403/100;
403/341
[58] Field of Search .......................... 108/11, 907, 208;
280/274, 281.1, 400, 483, 489, 491.1, 33.996, 62,
287, 278, 477; 403/341, 102, 100, 353

[56] References Cited

U.S. PATENT DOCUMENTS

| | | | |
|---|---|---|---|
| 2,671,673 | 3/1954 | Benson | 280/477 |
| 4,666,008 | 5/1987 | Shepard et al. | 180/907 X |
| 4,708,219 | 11/1987 | Cresswell | 180/11 |
| 4,944,359 | 7/1990 | Doman et al. | 180/11 X |
| 5,036,938 | 8/1991 | Blount | 180/907 |

FOREIGN PATENT DOCUMENTS 2133358  7/1984  United Kingdom ................ 180/907

*Primary Examiner*—Charles A. Marmor
*Assistant Examiner*—Ann Marie Boehler
*Attorney, Agent, or Firm*—Charles J. Prescott

[57] ABSTRACT

A personal mobility vehicle including rear and front frame sections which are quickly and easily engageable and disconnectable one to another. The rear frame section has a pair of coaxial rear spaced wheels and a pair of locator pins laterally extending preferably from each side margin adjacent each forward corner of the rear frame section. These locator pins engage with a locking bar rearwardly extending from and adjacent each rear corner of said front frame section. Each bar has a notch formed into its lower and upper margins adapted to engage the locator pins in a pivotal motion to guide the front and rear frame sections into abutting generally coplaner assembled relationship, thus preventing fore and aft and vertical movement therebetween. A latch-type connector preferably centrally positioned releasibly secures this coplaner relationship during use of the vehicle.

19 Claims, 3 Drawing Sheets

PERSONAL MOBILITY VEHICLE

BACKGROUND OF THE INVENTION

This invention relates generally to personal mobility utility carts, and more particularly to a personal mobility vehicle whose frame components may be quickly dismantled and reassembled for use.

Considerable technological effort has been devoted to three wheeled, self propelled utility vehicles for one person. Such vehicles are rapidly becoming common place for transporting handicapped and physically impaired persons from home or car to other locations.

Many such vehicles are intended for use in conjunction with being transported in an automobile, van or the like. To facilitate transporting such vehicles, although they are, in the first instance, relatively compact, various inventions have been dedicated to both dismantling and reducing the size of such vehicles for loading and unloading to and from a separate automobile or van.

One such device is disclosed in U.S. Pat. No. 4,757,868 to Cresswell which is directed to a three-wheeled self-propelled sulky-type vehicle which includes a frame which is dismantleable from the forward power drive unit and which includes a uniquely disposed seat arrangement. Cresswell has also invented the disassembleable sulky vehicle disclosed in U.S. Pat. No. 4,861,058 which is more particularly directed to a unique seat support structure. Another U.S. Pat. No. to Cresswell, 4,708,219 is similarly directed and includes a tee-bar having hoe-like blades which interlock into a scabbard for demounting the steerable motor driven front wheel assembly and also includes a unique detachable rear wheel arrangement.

Brandenfels in U.S. Pat. No. 4,750,578 teaches a dismantleable and collapsible sulky-type utility cart which includes a fully foldable steering handle and removable seat arrangement.

In U.S. Pat. No. 4,570,739 to Kramer, a personal mobility vehicle is disclosed having a fold-down steering handle and a forwardly frame section which is disconnectable from the rear frame and drive assembly.

Other somewhat less similar devices are disclosed in U.S. Pat. No. 4,834,409 to Kramer in which a narrowing rear wheel arrangement is disclosed, and in U.S. Pat. No. 4,947,955 to Hopely which teaches a take apart frame for personal vehicles providing a saddle-type arrangement in conjunction with a conventional latch means for securing the front and rear sections of the frame together.

The present invention provides an extremely easily operable releasable connecting arrangement between the front and rear sections of the frame of a personal self-propelled utility vehicle. The invention facilitates one-handed dismantling and reconnection of the two frame members while atop the ground which provide strength and rigidity in use, but is nonetheless easily operable without the need for any other tools or equipment whatsoever.

BRIEF SUMMARY OF THE INVENTION

This invention is directed to a personal mobility vehicle including rear and front frame sections which are quickly and easily engageable and disconnectable one to another. The rear frame section has a pair of coaxial rear spaced wheels and a pair of locator pins laterally extending preferably from each side margin adjacent each forward corner of the rear frame section. These locator pins engage with a locking bar rearwardly extending from and adjacent each rear corner of said front frame section. Each bar has a notch formed into its lower and upper margins adapted to engage the locator pins in a pivotal motion to guide the front and rear frame sections into abutting generally coplaner assembled relationship, thus preventing fore and aft and vertical movement therebetween. A latch-type connector preferably centrally positioned releasibly secures this coplaner relationship during use of the vehicle.

It is therefore an object of this invention to provide a personal mobility vehicle having a two-piece frame arrangement which may be easily and quickly dismantled for storage within a separate vehicle.

It is another object of this invention to provide a personal mobility vehicle which is readily reassembleable by one person without the need for hand tools after the components are laid atop the ground.

It is yet another object to provide the above invention which provides an extremely secure and rigid interconnection between frame sections which is extremely wear resistant and uninhibited in function by dirt or debris.

It is yet another object to provide the above invention which is assembleable and dismantleable without the need for any hand tools, additional equipment or involving any loose connecting parts whatsoever.

In accordance with these and other objects which will become apparent hereinafter, the instant invention will now be described with reference to the accompanying drawings.

DETAILED DESCRIPTION OF THE INVENTION

Figure 1:
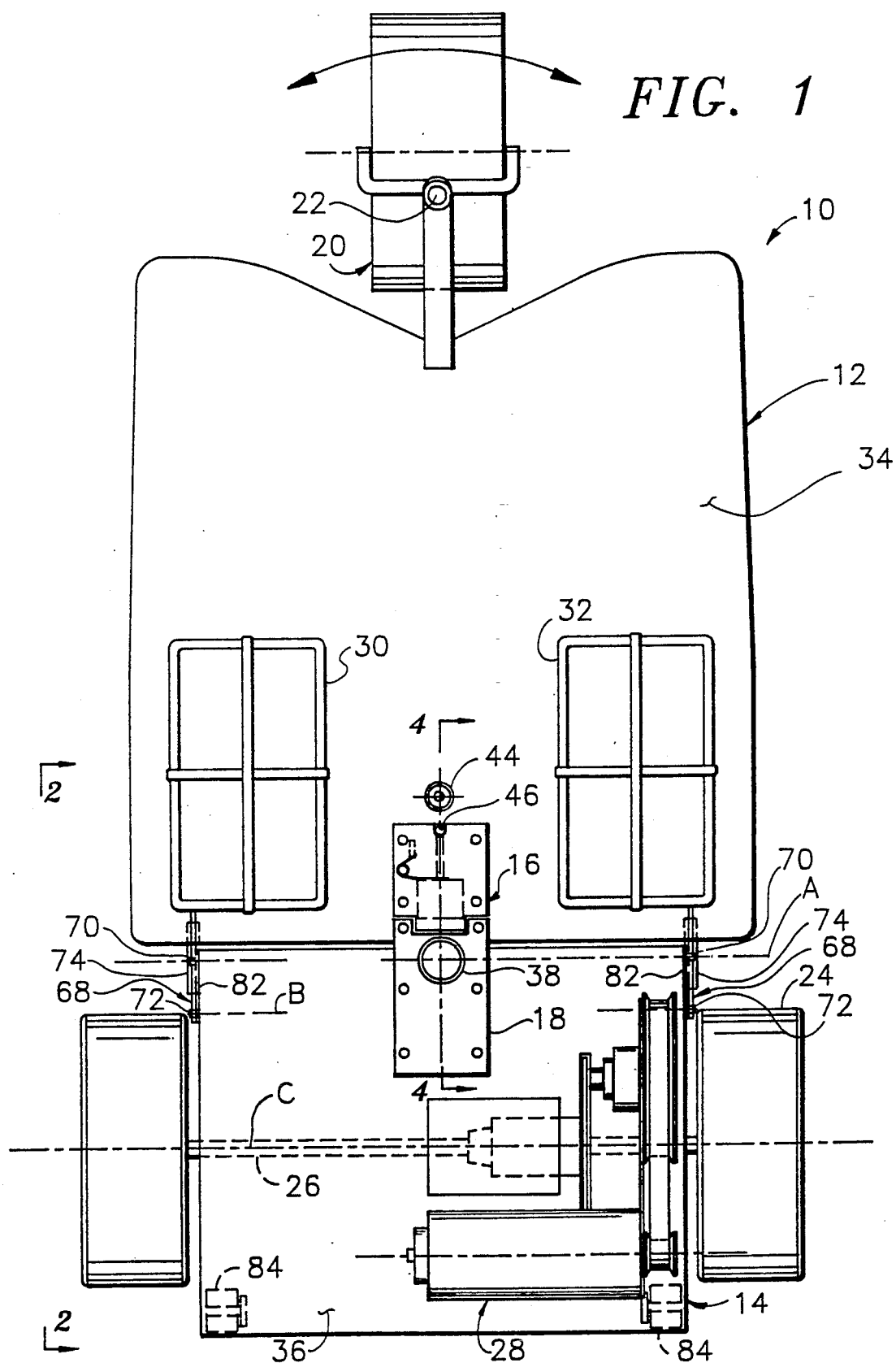
FIG. 1 is a simplified plan view of a personal mobility vehicle of the type claimed having the frame connection means of the present invention installed therewithin.

Referring now to the drawings, a personal mobility vehicle is shown generally at numeral 10 which includes a front frame section 12 and a rear frame section 14. The front frame section 12 includes a centrally positioned steerable front wheel 20 which is rotatable about axis 22 in the direction of the arrow in a well-known manner. Batteries 30 and 32 are connected atop the front frame panel 34 of the front frame section 12 and are operably connected to a drive means 28 which is mounted atop the rear frame panel 36 of the rear frame section 14. Drive means 28 is operably connected to rear axle 26 so as to drive a pair of spaced rear wheels 24 disposed on either side of the rear frame section 14 as shown in FIG. 1.

Figure 4:
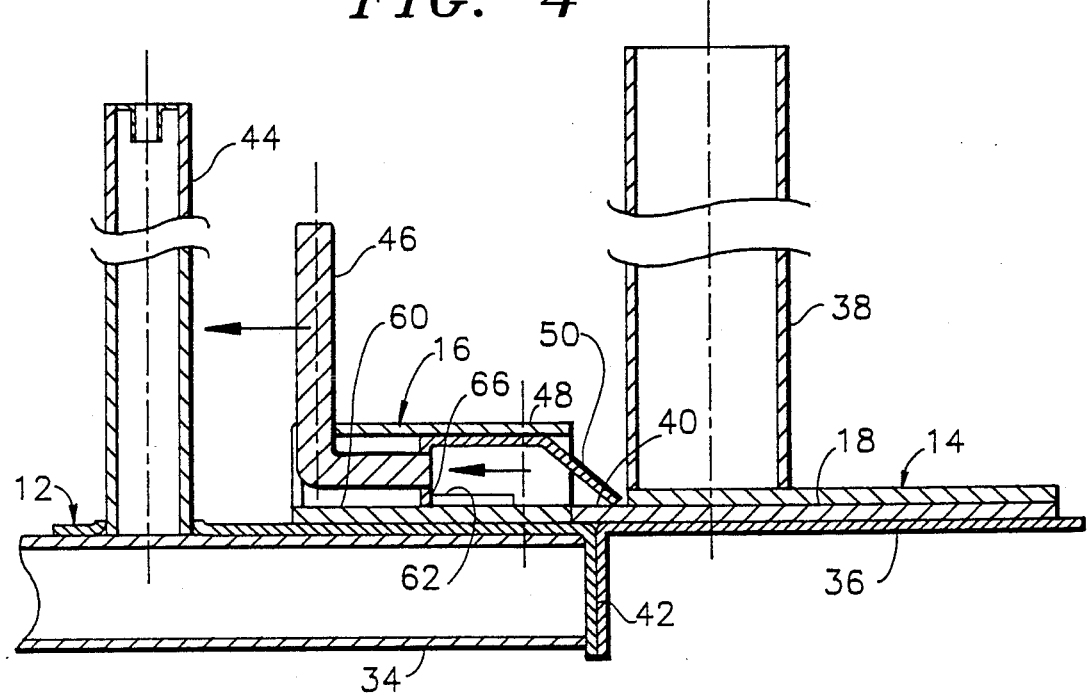
FIG. 4 is a section view in the direction of arrows 4—4 in FIG. 1.
Figure 5:
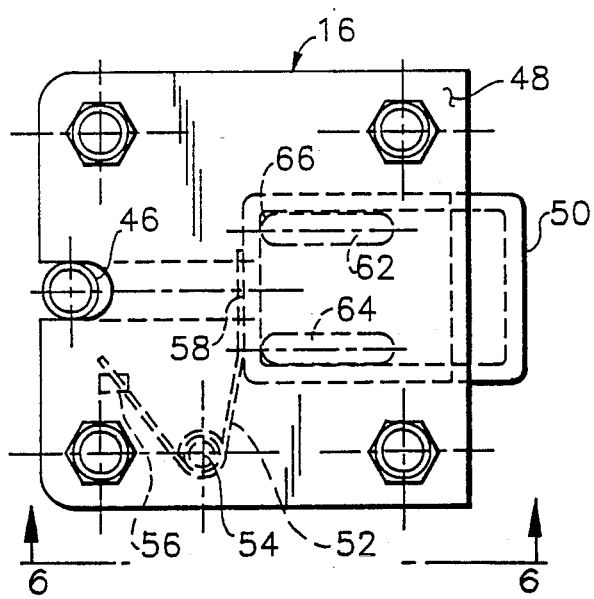
FIG. 5 is an enlarged top plan view of the latch means 16 shown in FIG. 1.
Figure 6:
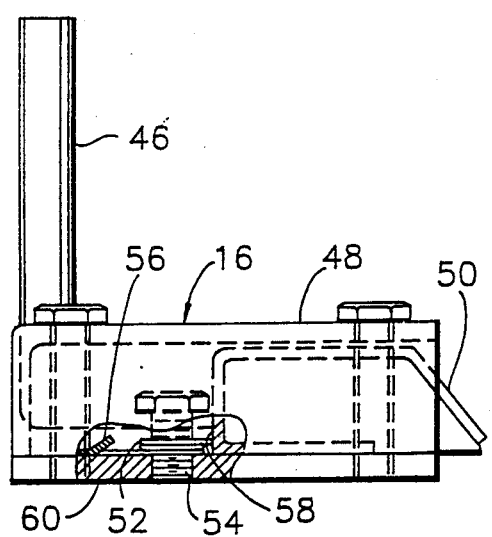
FIG. 6 is a partially broken view in the direction of arrows 6—6 in FIG. 5.

The centrally positioned connecting means between the front frame section 12 and the rear frame section 14 is shown generally at numeral 16 in FIG. 1 and as better seen in FIGS. 4, 5 and 6. This connecting means 16 includes a longitudinally translatable latch bolt 50 which is forwardly movable in the direction of the arrow within housing 48 by connected upwardly extending latch handle 46. A conventional spring 52 mounted on bolt 54 as shown in FIGS. 5 and 6 extends in one direction to contact and act against surface 58 of latch bolt 50 and at the other end to bear against stop 56 formed into the latch bottom plate 60. The spring arrangement maintains the latch bolt 50 in its fully rearward locked position as shown against the end 66 of stop 62 and co-acting stop 64.

The distal end of latch bolt 50 engages against striker surface 40 of plate 18 which is connected atop the rear frame panel 36 of rear frame section 14. A tubular seat support 38 upwardly extends from plate 18. So as to provide one-handed actuation of latch bolt 50 by latch handle 46, positioning of latch handle 46 is immediately adjacent upright fixed member 44 connected and upwardly extending from front frame panel 34. Thus, by one handed grasping around the latch handle 46 and the fixed member 44 in squeezing fashion, latch bolt 50 may be moved in the direction of the arrows to disengage it from striker plate 40.

Figure 2:
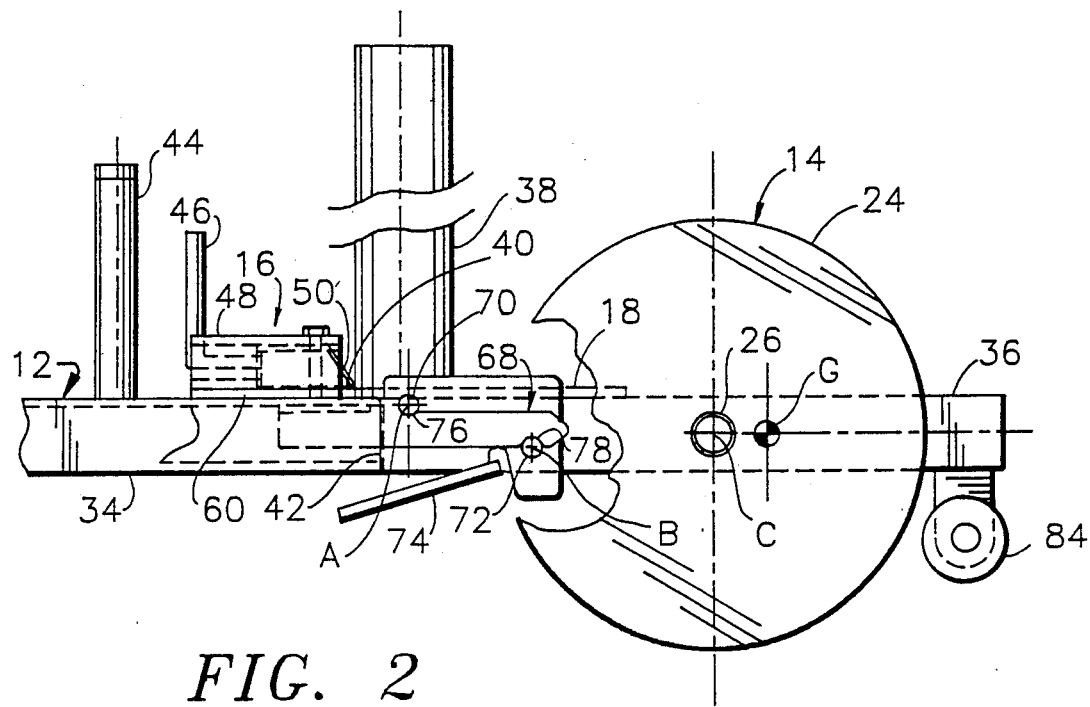
FIG. 2 is a view in the direction of arrows 2—2 in FIG. 1.
Figure 3:
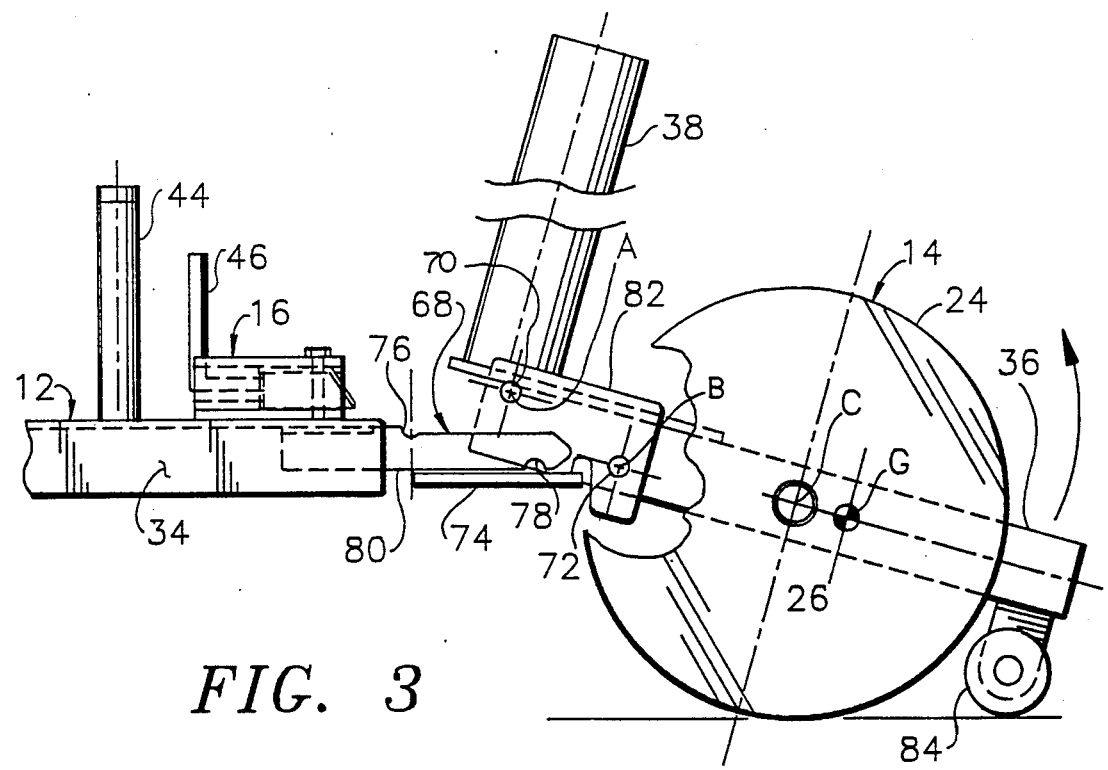
FIG. 3 is a view similar to FIG. 2 showing the front and rear frame sections in a partially dismantled configuration.

The remaining components of the releasable locking mechanism between front frame section 12 and rear frame section 14 are best seen in FIGS. 1, 2 and 3. This portion of the frame connecting arrangement properly aligns the abutting surface 42 in FIG. 2 of the front and rear panel sections 34 and 36, and prevents longitudinal or fore and aft, vertical, and lateral relative movement therebetween. Two locating pins 70 and 72 are connected and laterally extend from plates 82 which are rigidly connected on either side of the rear frame panel 36 near its forwardly corners and just aft of the forward margin thereof. These locator pins 70 and 72 are spaced apart with locator pin 70 being closer to the forward margin of rear frame panel 36 and slightly higher than locator pin 72 as shown.

A locking bar 68 is connected to and rearwardly extends from the rear corners of the front frame panel 34 and are spaced apart a width generally equal to the outside dimension between plates 82. These locking bars 68 include notches 76 and 78 formed into the upper and lower edges, respectively, of the locking bar 68. These notches 76 and 78 have a relative spacing similar to that of locator pins 70 and 72.

By this arrangement, locator pin 72 is securely positionable within notch 78 simultaneous with locator pin 70 positioned securely within notch 76 as shown in FIG. 2. This interengagement, coupled with the action of lock bolt 50 against striker surface 40 as previously described, cooperate to fully secure and prevent all movement between the front and rear frame panels 34 and 36.

The relationship between locator pins 72 about axis B and notches 78 provide that the two may be matably coupled as an initial stage of assembly. Thereafter, the rear frame section 14 may be pivoted about axis C of axle 26 in the direction of the arrows shown in FIG. 3 to a point shown in FIG. 2 wherein front frame panel 34 is coplaner, aligned and abutted at surface 42 with rear frame member 36 and is maintained in this orientation so long as latch bolt 50 is lockably engaged against striker surface 40.

In the preferred embodiment, the center of gravity G as shown in FIGS. 2 and 3 is aft of axis C. By this arrangement, when the rear frame section 14 is separated, it thus has a natural tendency to angle upwardly at its forward margin. A tip wheel assembly 84 connected and downwardly extending from the rearward corners of rear frame member 36 are provided so as to limit this angular movement to a position shown in FIG. 3 and also to provide for ease of rolling movement of the rear frame section 14 atop the ground for reassembly alignment with front frame section 12.

To further facilitate reassembly between the front and rear frame sections 12 and 14, a guide plate 74 connected to each forward corner of the rear frame member 36 is also provided as shown. These guide plates 74 are oriented such that the lower edge 80 of each locking bar 68 will slidably engage thereatop as the two frame sections are brought together to guide notches 78 onto locator pins 72. The angular orientation of guide plates 74 is chosen so that these guide plates 74 are generally horizontal when the rear frame section 14 is freely resting atop the ground and balanced and supported by the tip wheel assemblies 84.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

what is claimed is:

1. A personal mobility vehicle comprising:

a front frame section having a front steerable wheel operably connected thereto;

a rear frame section having two spaced rear wheels;

drive means mounted on one said frame section for propelling said vehicle;

connecting means between and for releasibly locking together said front and rear frame sections including a releasible latch means and a pivotally actuated retention means;

said retention means including a horizontally elongated locking bar having spaced generally parallel horizontal lower and upper margins and connected to and rearwardly extending from the rearward margin of said front frame section and first and second spaced locator pins connected to and laterally extending from adjacent the forward margin of said rear frame section;

said locking bar having first and second notches formed into said lower and upper margins, respectively, said first notch downwardly facing and positioned adjacent the distal end of said locking bar and said second notch upwardly facing and spaced farther from said distal end;

said first notch engaging atop said first locator pin as said front and rear frame sections are brought together at an acute angle one to another in an initial engagement position;

said front and rear frame sections pivotable one to another about said first locator pin from said initial engagement position to a final abutting engagement position wherein said second locator pin is within said second notch and said latch means is secured to only prevent further pivotal movement between said front and rear frame sections, said first and second pins within said first and second notches, respectively, cooperatively configured to prevent fore-and-aft movement between said front and rear frames.

2. A personal mobility vehicle as set forth in claim 1, further comprising:
a guide means connected to said rear frame section and positioned beneath said first and second locator pins for supporting and guiding locking bar into said initial engagement position.

3. A personal mobility vehicle as set forth in claim 2, wherein:
a center of gravity of said rear frame section is rearward of the axis of said rear wheels whereby said rear frame section forward margin is upwardly disposed when said rear frame section is positioned atop the ground separate from said front frame section.

4. A personal mobility vehicle as set forth in claim 3, further comprising:
a tip limiting wheel connected to and downwardly disposed from the rearward margin of said rear frame section and structured to contact the ground when said rear frame section is separate from said front frame section to maintain said rear frame section at a preselected acute angle to the ground, to facilitate rolling said rear frame section, and to facilitate establishing said initial engagement position.

5. A personal mobility vehicle as set forth in claim 4, further comprising:
an upwardly extending latch handle connected to a movable spring biased latch bolt of said latch means, said latch handle positioned in spaced relation with an adjacent fixed upright member whereby said latch means may be released in one-handed squeezing action between said latch handle and said fixed upright member.

6. A personal mobility vehicle as set forth in claim 5, wherein:
said front and rear frame sections are generally coplaner in said final engagement position.

7. A personal mobility vehicle as set forth in claim 2, wherein:
said guide means includes an elongated guide plate connected to each front corner of said rear frame section which forwardly extends downwardly at an acute angle beneath said first and second locator pins.

8. A personal mobility vehicle comprising:
a front frame section having a front steerable wheel operably connected thereto;
a rear frame section having two spaced rear wheels;
drive means mounted on one said frame section for propelling said vehicle;
a retention means including a horizontally elongated locking bar having spaced generally parallel horizontal lower and upper margins and connected to and rearwardly extending from each rear corner of said front frame section and first and second spaced locator pins connected to and laterally extending from each side of, and adjacent each front corner of said rear frame section;
each said locking bar having first and second notches formed into said lower and upper margins, respectively, said first notch downwardly facing and positioned adjacent the distal end of each said locking bar and said second notch upwardly facing and spaced farther from each said distal ends;
each said first notch engaging atop one said first locator pin as said front and rear frame sections are positioned at an acute angle together in an initial engagement position;
said front and rear frame sections pivotable one to another about said first locator pin from said initial engagement position to a final abutting engagement position wherein each said second locator pin is within one said second notch; and
a latch means connected between said front and rear frame sections for only securing from pivotal movement between said front and rear frame sections when said front and rear frame sections are in said final engagement position, said first and second pins within said first and second notches, respectively, cooperatively configured to prevent fore-and-aft movement between said front and rear frames.

9. A personal mobility vehicle as set forth in claim 8, further comprising:
a guide means connected to said rear frame section and positioned beneath each said first and second locator pins for supporting and guiding locking bar into said initial engagement position.

10. A personal mobility vehicle as set forth in claim 9, wherein:
a center of gravity of said rear frame section is rearward of the axis of said rear wheels whereby said rear frame section forward margin is upwardly disposed when said rear frame section is positioned atop the ground separate from said front frame section.

11. A personal mobility vehicle as set forth in claim 10, further comprising:
a tip limiting wheel connected to and downwardly disposed from the rearward margin of said rear frame section and structured to contact the ground when said rear frame section is separate from said front frame section to maintain said rear frame section at a preselected acute angle to the ground, to facilitate rolling said rear frame section, and to facilitate establishing said initial engagement position.

12. A personal mobility vehicle as set forth in claim 11, further comprising:
an upwardly extending latch handle connected to a movable spring biased latch bolt of said latch means, said latch handle positioned in spaced relation with an adjacent fixed upright member whereby said latch means may be released in one-handed squeezing action between said latch handle and said fixed upright member.

13. A personal mobility vehicle as set forth in claim 12, wherein:
said front and rear frame sections are generally coplaner in said final engagement position.

14. A personal mobility vehicle comprising:
a front frame section having a front steerable wheel operably connected thereto;
a rear frame section having two spaced rear wheels;
a drive motor and battery mounted on one said frame section operably connected to at least one said wheel for propelling said vehicle;
a releasible connection between and for releasibly locking together said front and rear frame sections including a releasible latch and a pivotally actuated retainer;
said retainer including a horizontally elongated locking bar having spaced generally parallel horizontal lower and upper margins and connected to and rearwardly extending from each rear corner of said front frame section and first and second spaced locator pins connected to and laterally extending from each side of, and adjacent each front corner of said rear frame section;

each said locking bar having first and second notches formed into said lower and upper margins, respectively, said first notch downwardly facing and positioned adjacent the distal end of each said locking bar and said second notch upwardly facing and spaced farther from each said distal end;

each said first notch engaging atop one said first locator pin as said front and rear frame sections are positioned at an acute angle together in an initial engagement position;

said front and rear frame sections pivotable one to another about said first locator pin from said initial engagement position to a final abutting engagement position wherein each said second locator pin is within one said second notch and said latch is secured to only prevent further pivotal movement between said front and rear frame sections, said first and second pins within said first and second notches, respectively, cooperatively configured to prevent fore-and-aft movement between said front and rear frames.

15. A personal mobility vehicle as set forth in claim 14, further comprising:
a guide means connected to said rear frame section and positioned beneath each said first and second locator pins for supporting and guiding locking bar into said initial engagement position.

16. A personal mobility vehicle as set forth in claim 15, wherein:
a center of gravity of said rear frame section is rearward of the axis of said rear wheels whereby said rear frame section forward margin is upwardly disposed when said rear frame section is positioned atop the ground separate from said front frame section.

17. A personal mobility vehicle as set forth in claim 16, further
a tip limiting wheel connected to and downwardly disposed from the rearward margin of said rear frame section and structured to contact the ground when said rear frame section is separate from said front frame section to maintain said rear frame section at a preselected acute angle to the ground, to facilitate rolling said rear frame section, and to facilitate establishing said initial engagement position.

18. A personal mobility vehicle as set forth in claim 17, further comprising:
an upwardly extending latch handle connected to a movable spring biased latch bolt of said latch means, said latch handle positioned in spaced relation with an adjacent fixed upright member whereby said latch means may be released in one-handed squeezing action between said latch handle and said fixed upright member.

19. A personal mobility vehicle as set forth in claim 18, wherein:
said front and rear frame sections are generally coplaner in said final engagement position.

* * * * *